United States Patent
Kato et al.

(10) Patent No.: US 10,128,532 B2
(45) Date of Patent: Nov. 13, 2018

(54) SULFIDE SOLID ELECTROLYTE MATERIAL, BATTERY, AND METHOD FOR PRODUCING SULFIDE SOLID ELECTROLYTE MATERIAL

(71) Applicant: TOYOTA JIDOSHA KABUSHIKI KAISHA, Toyota-shi, Aichi-ken (JP)

(72) Inventors: Yuki Kato, Susono (JP); Mayuko Osaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 14/758,712

(22) PCT Filed: Dec. 18, 2013

(86) PCT No.: PCT/JP2013/083950
§ 371 (c)(1),
(2) Date: Jun. 30, 2015

(87) PCT Pub. No.: WO2014/109191
PCT Pub. Date: Jul. 17, 2014

(65) Prior Publication Data
US 2015/0372345 A1    Dec. 24, 2015

(30) Foreign Application Priority Data

Jan. 11, 2013  (JP) .................... 2013-003075

(51) Int. Cl.
*H01M 10/00* (2006.01)
*H01M 10/0562* (2010.01)
(Continued)

(52) U.S. Cl.
CPC .......... *H01M 10/0562* (2013.01); *H01B 1/10* (2013.01); *H01M 4/38* (2013.01);
(Continued)

(58) Field of Classification Search
CPC .... H01B 1/10; H01M 4/485; H01M 10/0562; H01M 4/38; H01M 4/587; H01M 4/62;
(Continued)

(56) References Cited

U.S. PATENT DOCUMENTS 6,428,935 B1    8/2002  Takada et al.
2012/0301796 A1* 11/2012  Ohtomo .............. H01M 10/052
                                              429/322
2013/0040208 A1   2/2013  Kann et al.

FOREIGN PATENT DOCUMENTS

CN    102823049 A    12/2012
JP    H09293516    * 11/1997
(Continued)

OTHER PUBLICATIONS

Machine Translation of JPH09293516 A, Fujino Makoto, Extracted on the Jan. 4, 2018. (Year: 2011).*
(Continued)

*Primary Examiner* — Nicholas P D'Aniello
*Assistant Examiner* — Abibatu O Ojo-Amoo
(74) *Attorney, Agent, or Firm* — Oliff PLC (57) ABSTRACT

Sulfide solid electrolyte material with favorable ion conductivity, wherein charge and discharge efficiency is inhibited from decreasing. Solves problem by providing a sulfide solid electrolyte material including a Li element, Si element, P element, S element and O element, having peak at position of $2\theta=29.58°\pm0.50°$ in X-ray diffraction measurement using CuKα ray, wherein sulfide solid electrolyte material does not have peak at position of $2\theta=27.33°\pm0.50°$ in X-ray diffraction measurement using CuKα ray, or in case of having peak at position of $2\theta=27.33°\pm0.50°$, value of $I_B/I_A$ is 1 or less when diffraction intensity at peak of $2\theta=29.58°\pm0.50°$ is regarded as $I_A$ and diffraction intensity at peak of $2\theta=27.33°\pm0.50°$ is regarded as $I_B$; and wherein
(Continued)

molar fraction of O element to total of S element and O element is larger than 0.2.

14 Claims, 6 Drawing Sheets

(51) Int. Cl.
*H01M 10/052* (2010.01)
*H01B 1/10* (2006.01)
*H01M 4/62* (2006.01)
*H01M 10/0525* (2010.01)
*H01M 4/38* (2006.01)
*H01M 4/485* (2010.01)
*H01M 4/587* (2010.01)

(52) U.S. Cl.
CPC .......... *H01M 4/485* (2013.01); *H01M 4/587* (2013.01); *H01M 4/62* (2013.01); *H01M 10/052* (2013.01); *H01M 10/0525* (2013.01); *H01M 2300/0068* (2013.01); *H01M 2300/0071* (2013.01)

(58) Field of Classification Search
CPC .......... H01M 10/052; H01M 10/0525; H01M 2300/0068; H01M 2300/0071
USPC ........................................ 429/322
See application file for complete search history.

(56) References Cited

FOREIGN PATENT DOCUMENTS

| JP | 2011-086556 A | 4/2011 |
|---|---|---|
| WO | 00/28608 A1 | 5/2000 |
| WO | 2011/118801 A1 | 9/2011 |

OTHER PUBLICATIONS

Abstract of JPH09293516 A, Fujino Makoto, Extracted on the Jan. 4, 2018. (Year: 2011).*

Kamaya et al. "A Lithium Superionic Conductor", Nature Materials, DOI: 10.1038/NMAT 3066, pp. 682-686, Jul. 31, 2011.

Kanno et al. "Lithium Ionic Conductor Thio-Lisicon the $Li_2S$—$GeS_2$—$P_2S_5$ System", Journal of the Electrochemical Society, 148 (7), pp. A742-A746, Jun. 5, 2001.

Ong et al. "Phase Stability, Electrochemical Stability and Ionic Conductivity in the $Li10\pm1MP2\times12$ (M=Ge, Si, Sn, Al or P, and X=O, S or Se) Family of Superionic Conductors", Energy & Environmental Science, Accepted Manuscript, pp. 1-23, Oct. 2, 2012.

Murayama et al. "Synthesis of New Lithium Ionic Conductor Thio-Lisicon-Lithium Silicon Sulfides System", Journal of Solid State Chemistry 168, pp. 140-148, Jul. 15, 2002.

* cited by examiner

FIG. 1

UPPER ROW: SULFIDE SOLID ELECTROLYTE MATERIAL WITH HIGH ION CONDUCTIVITY
LOWER ROW: SULFIDE SOLID ELECTROLYTE MATERIAL WITH LOW ION CONDUCTIVITY

SULFIDE SOLID ELECTROLYTE MATERIAL, BATTERY, AND METHOD FOR PRODUCING SULFIDE SOLID ELECTROLYTE MATERIAL

TECHNICAL FIELD

The present invention relates to a sulfide solid electrolyte material with favorable ion conductivity, in which charge and discharge efficiency is inhibited from decreasing.

BACKGROUND ART

In accordance with a rapid spread of information-relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. In contrast, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Non Patent Literature 1, an Li ion conductor (a sulfide solid electrolyte material) having a composition of $Li_{(4-x)}Ge_{(1-x)}P_xS_4$ is disclosed. Also, in Patent Literature 1, an LiGePS-based sulfide solid electrolyte material having a specific peak in X-ray diffraction measurement is disclosed. In addition, in Non Patent Literature 2, an LiGePS-based sulfide solid electrolyte material is disclosed.

CITATION LIST

Patent Literature

Patent Literature 1: WO 2011/118801 A1

Non Patent Literatures

Non Patent Literature 1: Ryoji Kanno et al., "Lithium Ionic Conductor Thio-LISICON The $Li_2S$—$GeS_2$—$P_2S_5$ System", Journal of The Electrochemical Society, 148 (7) A742-A746 (2001)
Non Patent Literature 2: Noriaki Kamaya et al., "A lithium superionic conductor", Nature Materials, Advanced online publication, 31 Jul. 2011, DOI:10.1038/NMAT3066

SUMMARY OF INVENTION

Technical Problem

A solid electrolyte material with favorable ion conductivity is demanded from the viewpoint of achieving higher output of a battery. In Patent Literature 1, it is disclosed that a sulfide solid electrolyte material with a high ratio of a crystal phase having a specific peak in X-ray diffraction measurement has favorable ion conductivity. On the other hand, the problem is that an LiGePS-based sulfide solid electrolyte material described in Patent Literature 1 is subjected to reductive decomposition and decreases charge and discharge efficiency when used for a battery together with an anode active material (such as graphite) which is comparatively high in reduction potential and low in action potential.

The present invention has been made in view of the problem, and the main object thereof is to provide a sulfide solid electrolyte material with favorable ion conductivity, in which charge and discharge efficiency is inhibited from decreasing.

Solution to Problem

In order to solve the problems, the present invention provides a sulfide solid electrolyte material comprising a Li element, a Si element, a P element, a S element and an O element, having a peak at a position of $2\theta=29.58°\pm0.50°$ in X-ray diffraction measurement using a CuKα ray, characterized in that the sulfide solid electrolyte material does not have a peak at a position of $2\theta=27.33°\pm0.50°$ in X-ray diffraction measurement using a CuKα ray, or in the case of having a peak at the position of $2\theta=27.33°\pm0.50°$, a value of $I_B/I_A$ is 1 or less when diffraction intensity at the peak of $2\theta=29.58°\pm0.50°$ is regarded as $I_A$ and diffraction intensity at the peak of $2\theta=27.33°\pm0.50°$ is regarded as $I_B$, and characterized in that a molar fraction (O/(S+O)) of the O element to the total of the S element and the O element is larger than 0.2.

According to the present invention, the ratio of a crystal phase having a peak in the vicinity of $2\theta=29.58°$ is so high as to allow the sulfide solid electrolyte material with favorable ion conductivity. In addition, the introduction of an O element into the sulfide solid electrolyte material comprising a Li element, a Si element, a P element and a S element allows the sulfide solid electrolyte material in which charge and discharge efficiency is inhibited from decreasing.

Also, the present invention provides a sulfide solid electrolyte material comprising an octahedron O composed of a Li element and a S element, a tetrahedron $T_1$ composed of an $M_a$ element and a S element, and a tetrahedron $T_2$ composed of an $M_b$ element and a S element, characterized in that the tetrahedron $T_1$ and the octahedron O share an edge, and the tetrahedron $T_2$ and the octahedron O contain a crystal structure sharing a corner as the main body, at least one of the $M_a$ and the $M_b$ contains Si, at least one of the $M_a$ and the $M_b$ contains P, at least one of the tetrahedron $T_1$ and the tetrahedron $T_2$ is such that a part or all of the S element bonding to the Si element is substituted with an O element, and a molar fraction (O/(S+O)) of the O element to the total of the S element and the O element is larger than 0.2.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, at least one of the tetrahedron $T_1$ and the tetrahedron $T_2$ is such that part or all of the S element bonding to the Si element is substituted with an O element, so as to allow the sulfide solid electrolyte material in which charge and discharge efficiency is inhibited from decreasing.

In the invention, the molar fraction (O/(S+O)) preferably satisfies $0.25 \leq (O/(S+O)) \leq 0.35$.

In the invention, a molar fraction (P/(P+Si)) of the P element to the total of the P element and the Si element preferably satisfies $0.65 \leq (P/(P+Si)) \leq 0.75$.

Also, the present invention provides a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the battery with high charge and discharge efficiency.

Also, the present invention provides a method for producing a sulfide solid electrolyte material, the sulfide solid electrolyte material being the sulfide solid electrolyte material having the peak intensity ratio described above, comprising steps of: an ion conductive material synthesizing step of synthesizing an amorphized ion conductive material by mechanical milling while using a raw material composition containing the Li element, the Si element, the P element, the S element and the O element, and a heating step of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the inclusion of an O element in the raw material composition allows the sulfide solid electrolyte material in which charge and discharge efficiency is inhibited from decreasing.

Also, the present invention provides a method for producing a sulfide solid electrolyte material, the sulfide solid electrolyte material being the sulfide solid electrolyte material having the crystal structure described above, comprising steps of: an ion conductive material synthesizing step of synthesizing an amorphized ion conductive material by mechanical milling while using a raw material composition containing the Li element, the $M_a$ element, the $M_b$ element, the S element and the O element, and a heating step of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the inclusion of an O element in the raw material composition allows the sulfide solid electrolyte material in which charge and discharge efficiency is inhibited from decreasing.

In the invention, the raw material composition preferably contains a material having an Si—O bond.

Advantageous Effects of Invention

The present invention produces the effect such as to allow a sulfide solid electrolyte material with favorable ion conductivity, in which charge and discharge efficiency is inhibited from decreasing.

DESCRIPTION OF EMBODIMENTS

A sulfide solid electrolyte material, a battery and a method for producing a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment comprises a Li element, a Si element, a P element, a S element and an O element, has a peak at a position of $2\theta=29.58°\pm0.50°$ in X-ray diffraction measurement using a CuKα ray, characterized in that the sulfide solid electrolyte material does not have a peak at a position of $2\theta=27.33°\pm0.50°$ in X-ray diffraction measurement using a CuKα ray, or in the case of having a peak at the position of $2\theta=27.33°\pm0.50°$, a value of $I_B/I_A$ is 1 or less when diffraction intensity at the peak of $2\theta=29.58°\pm0.50°$ is regarded as $I_A$ and diffraction intensity at the peak of $2\theta=27.33°\pm0.50°$ is regarded as $I_B$; and characterized in that a molar fraction (O/(S+O)) of the O element to the total of the S element and the O element is larger than 0.2.

According to the first embodiment, the ratio of a crystal phase having a peak in the vicinity of $2\theta=29.58°$ is so high as to allow the sulfide solid electrolyte material with favorable ion conductivity. In addition, the introduction of an O element into the sulfide solid electrolyte material having a Li element, a Si element, a P element and a S element allows the sulfide solid electrolyte material in which charge and discharge efficiency is inhibited from decreasing. Also, as described above, an LiGePS-based sulfide solid electrolyte material described in Patent Literature 1 is easily subjected to reductive decomposition when used for a battery together with an anode active material (such as graphite) which is comparatively high in reduction potential and low in action potential. The reason therefor is guessed to be that a Ge element contained in the sulfide solid electrolyte material is easily reduced. In contrast, in the first embodiment, the modification of a Ge element into a Si element allows the sulfide solid electrolyte material in which reductive decomposition is caused with difficulty. In addition, in the first embodiment, the modification of part or all of a S element bonding to a Si element into an O element allows the sulfide solid electrolyte material in which reductive decomposition is caused with further difficulty. The reason therefor is guessed to be that an Si—O bond is reduced with further difficulty as compared with an Si—S bond.

Figure 1:
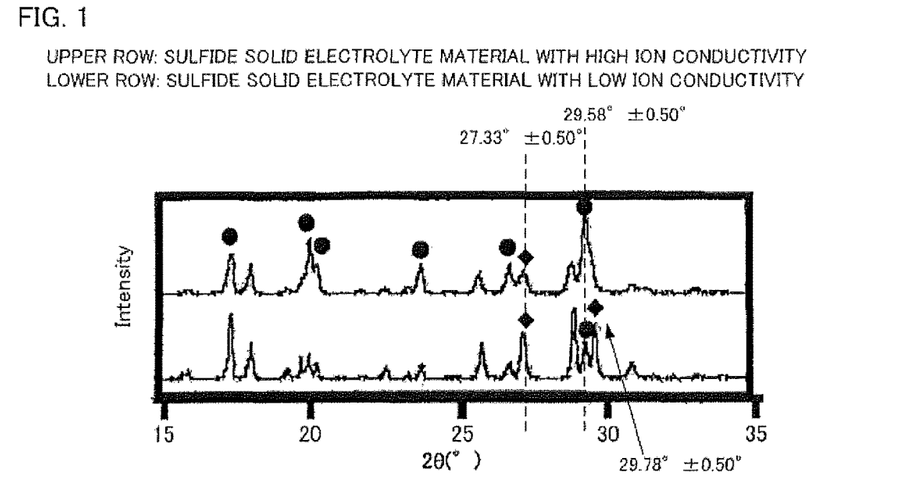
FIG. 1 is an X-ray diffraction spectrum explaining a difference between a sulfide solid electrolyte material with high ion conductivity and a sulfide solid electrolyte material with low ion conductivity.

FIG. 1 is an X-ray diffraction spectrum explaining a difference between a sulfide solid electrolyte material with high ion conductivity and a sulfide solid electrolyte material with low ion conductivity. Incidentally, the two sulfide solid electrolyte materials in FIG. 1 are not the LiSiPS-based sulfide solid electrolyte materials of the first embodiment but the LiGePS-based sulfide solid electrolyte materials; here, the difference in ion conductivity by a crystal structure is described by using the LiGePS-based sulfide solid electrolyte materials for convenience. Both of the two sulfide solid electrolyte materials in FIG. 1 have a composition of $Li_{3.25}Ge_{0.25}P_{0.75}S_4$. In FIG. 1, the sulfide solid electrolyte material with high ion conductivity has a peak at a position of $2\theta=29.58°\pm0.50°$ and a position of $2\theta=27.33°\pm0.50°$. Also, in FIG. 1, the sulfide solid electrolyte material with low ion conductivity has the same peak. Here, it is conceived that a crystal phase having a peak in the vicinity of $2\theta=29.58°$ and a crystal phase having a peak in the vicinity of $2\theta=27.33°$ are crystal phases different from each other. Incidentally, in the first embodiment, the crystal phase having a peak in the vicinity of $2\theta=29.58°$ and the crystal phase having a peak in the vicinity of $2\theta=27.33°$ are occasionally referred to as "crystal phase A" and "crystal phase B", respectively. Incidentally, this sulfide solid electrolyte material with high ion conductivity has the same crystal structure as the sulfide solid electrolyte material of the second embodiment, as described later.

Both of the crystal phases A and B are crystal phases exhibiting ion conductivity, which is different. The crystal phase A is conceived to be remarkably high in ion conductivity as compared with the crystal phase B.

Also, in the first embodiment, in order to distinguish from the sulfide solid electrolyte material with low ion conductivity, diffraction intensity at a peak in the vicinity of $2\theta=29.58°$ is regarded as $I_A$ and diffraction intensity at a peak in the vicinity of $2\theta=27.33°$ is regarded as $I_B$, and a value of $I_B/I_A$ is prescribed at 1 or less. Also, from the viewpoint of ion conductivity, the sulfide solid electrolyte material in the first embodiment is preferably high in the ratio of the crystal phase A with high ion conductivity. Thus, a value of $I_B/I_A$ is preferably smaller; specifically, preferably 0.55 or less, more preferably 0.45 or less, furthermore preferably 0.25 or less, particularly preferably 0.15 or less, extremely preferably 0.07 or less. Also, a value of $I_B/I_A$ is preferably 0. In other words, it is preferable that the sulfide solid electrolyte material of the first embodiment does not have a peak in the vicinity of $2\theta=27.33°$ as a peak of the crystal phase B.

The sulfide solid electrolyte material of the first embodiment has a peak in the vicinity of $2\theta=29.58°$. This peak is one of the peaks of the crystal phase A with high ion conductivity, as described above. Here, $2\theta=29.58°$ is an actual measurement value, and a crystal lattice changes somewhat due to factors such as material composition, so that a position of the peak occasionally shifts somewhat from $2\theta=29.58°$. Thus, in the first embodiment, the peak of the crystal phase A is defined as a peak at a position of $29.58°\pm0.50°$. The crystal phase A is ordinarily conceived to have peaks of $2\theta=17.38°$, $20.18°$, $20.44°$, $23.56°$, $23.96°$, $24.93°$, $26.96°$, $29.07°$, $29.58°$, $31.71°$, $32.66°$ and $33.39°$. Incidentally, also these peak positions occasionally shift in a range of $\pm0.50°$ (above all a range of $\pm0.30°$, particularly a range of $\pm0.10°$).

On the other hand, the peak in the vicinity of $2\theta=27.33°$ is one of the peaks of the crystal phase B with low ion conductivity, as described above. Here, $2\theta=27.33°$ is an actual measurement value, and a crystal lattice changes somewhat due to factors such as material composition, so that a position of the peak occasionally shifts somewhat from $2\theta=27.33°$. Thus, in the first embodiment, the peak of the crystal phase B is defined as a peak at a position of $27.33°\pm0.50°$. The crystal phase B is ordinarily conceived to have peaks of $2\theta=17.46°$, $18.12°$, $19.99°$, $22.73°$, $25.72°$, $27.33°$, $29.16°$ and $29.78°$. Incidentally, also these peak positions occasionally shift in a range of $\pm0.50°$ (above all a range of $\pm0.30°$, particularly a range of $\pm0.10°$).

Also, the sulfide solid electrolyte material of the first embodiment contains a Li element, a Si element, a P element, a S element and an O element. The sulfide solid electrolyte material of the first embodiment may be composed only of a Li element, a Si element, a P element, a S element and an O element, or further comprise another element. For example, part of the Li element may be substituted with a monovalent or divalent element. Examples of the monovalent or divalent element include at least one kind selected from the group consisting of Na, K, Mg, Ca and Zn. Incidentally, the amount of the monovalent or divalent element is preferably smaller than the amount of the Li element.

Also, part of the Si element may be substituted with a trivalent, tetravalent or pentavalent element. Similarly, part of the P element may be substituted with a trivalent, tetravalent or pentavalent element. Examples of the trivalent, tetravalent or pentavalent element include one kind selected from the group consisting of Sb, Ge, Sn, B, Al, Ga, In, Ti, Zr, V and Nb. Incidentally, the amount of the trivalent, tetravalent or pentavalent element is preferably smaller than the amount of the Si element or the P element; particularly, it is preferable that the sulfide solid electrolyte material does not contain Ge.

Also, the sulfide solid electrolyte material of the first embodiment comprises a S element and an O element. A molar fraction (O/(S+O)) of the O element to the total of the S element and the O element is not particularly limited but is, for example, preferably larger than 0.2, more preferably 0.25 or more, furthermore preferably 0.26 or more. The reason therefor is that too small molar fraction brings a possibility of being incapable of decreasing reductive decomposition potential. On the other hand, the molar fraction (O/(S+O)) is not particularly limited. It was confirmed that the effect of improving reducibility was caused even though O/(S+O) was in a range close to 1 as a result of calculating by first-principle calculation. Above all, O/(S+O) is, for example, preferably smaller than 0.4, more preferably 0.38 or less, furthermore preferably 0.35 or less. The reason therefor is that too large molar fraction brings a possibility of being incapable of obtaining a predetermined value of $I_B/I_A$. Incidentally, the molar fraction of the O element may be determined by XPS and EDX, for example.

Also, the sulfide solid electrolyte material of the first embodiment contains a P element and a Si element. A molar fraction (P/(P+Si)) of the P element to the total of the P element and the Si element is not particularly limited but is, for example, preferably larger than 0.6, more preferably 0.65 or more. The reason therefor is that too small molar fraction brings a possibility of being incapable of obtaining the sulfide solid electrolyte material with high ion conductivity. On the other hand, the molar fraction (P/(P+Si)) is not particularly limited but is, for example, preferably smaller than 0.8, more preferably 0.75 or less. The reason therefor is that too large molar fraction brings a possibility of being incapable of obtaining the sulfide solid electrolyte material with high ion conductivity.

The composition of the sulfide solid electrolyte material of the first embodiment is not particularly limited but is preferably a composition of $Li_{(4-x)}Si_{(1-x)}P_x(S_{1-y}O_y)_4$ (x satisfies 0<x<1 and y satisfies 0.2<y). The reason therefor is to allow the sulfide solid electrolyte material in which reductive decomposition is caused with difficulty. Here, a composition of $Li_{(4-x)}Si_{(1-x)}P_xS_4$ not having an O element corresponds to a composition of a solid solution of $Li_3PS_4$ and $Li_4SiS_4$. That is to say, this composition corresponds to a composition on a tie line of $Li_3PS_4$ and $Li_4SiS_4$. Incidentally, both $Li_3PS_4$ and $Li_4SiS_4$ correspond to an ortho-composition and have the advantage that chemical stability is high.

Also, "x" in $Li_{(4-x)}Si_{(1-x)}P_x(S_{1-y}O_y)_4$ is not particularly limited but satisfies preferably 0.6<x, more preferably 0.65≤x, for example. On the other hand, the "x" satisfies preferably x<0.8, more preferably x≤0.75, for example. The "y" satisfies preferably 0.2<y, more preferably 0.25≤y, furthermore preferably 0.26≤y. On the other hand, the "y" satisfies preferably y<0.4, more preferably y≤0.38, furthermore preferably y≤0.35.

The sulfide solid electrolyte material of the first embodiment is ordinarily a crystalline sulfide solid electrolyte material. Also, the sulfide solid electrolyte material of the first embodiment is preferably high in ion conductivity, and ion conductivity of the sulfide solid electrolyte material at 25° C. is preferably $1.0 \times 10^{-4}$ S/cm or more, more preferably $1.0 \times 10^{-3}$ S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 µm to 50 µm, for example.

The sulfide solid electrolyte material of the first embodiment has so high ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a method for producing the sulfide solid electrolyte material of the first embodiment is described in detail in "C. Method for producing sulfide solid electrolyte material" mentioned below. Also, the sulfide solid electrolyte material of the first embodiment may have characteristics of the after-mentioned second embodiment together.

2. Second Embodiment

Next, a second embodiment of a sulfide solid electrolyte material of the present invention is described. The sulfide solid electrolyte material of the second embodiment comprises an octahedron O composed of a Li element and a S element, a tetrahedron $T_1$ composed of an $M_a$ element and a S element, and a tetrahedron $T_2$ composed of an $M_b$ element and a S element, characterized in that the tetrahedron $T_1$ and the octahedron O share an edge, and the tetrahedron $T_2$ and the octahedron O contain a crystal structure sharing a corner as the main body; and at least one of the $M_a$ and the $M_b$ contains Si, at least one of the $M_a$ and the $M_b$ contains P, at least one of the tetrahedron $T_1$ and the tetrahedron $T_2$ is such that a part or all of the S element bonding to the Si element is substituted with an O element, and a molar fraction (O/(S+O)) of the O element to the total of the S element and the O element is larger than 0.2.

According to the second embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, at least one of the tetrahedron $T_1$ and the tetrahedron $T_2$ is such that part or all of the S element bonding to the Si element is substituted with an O element, so as to allow the sulfide solid electrolyte material in which charge and discharge efficiency is inhibited from decreasing.

Figure 2:
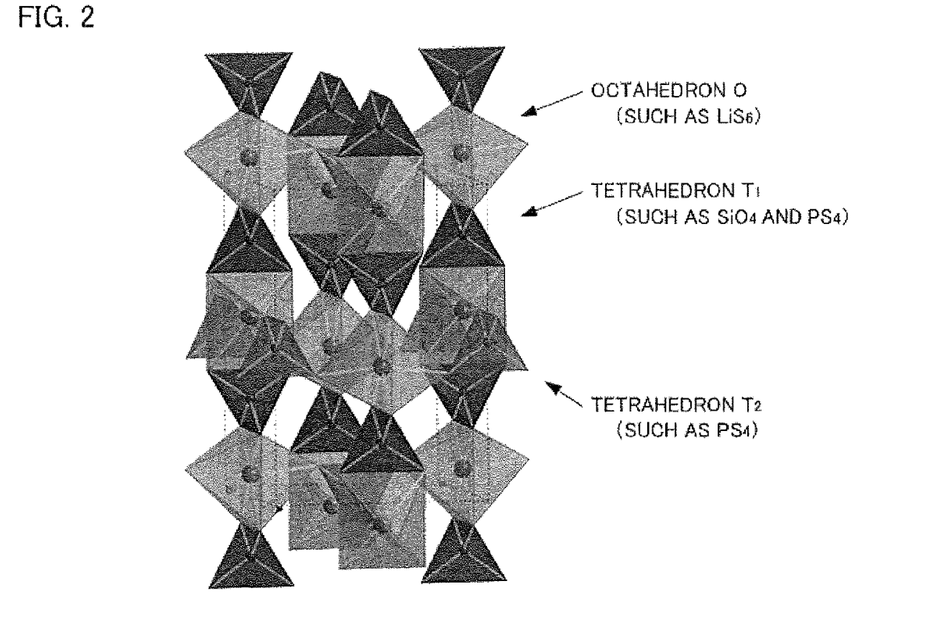
FIG. 2 is a perspective view explaining an example of a crystal structure of a sulfide solid electrolyte material of the present invention.

FIG. 2 is a perspective view explaining an example of a crystal structure of the sulfide solid electrolyte material of the second embodiment. In the crystal structure shown in FIG. 2, the octahedron O typically has Li as the central element, and is $LiS_6$ octahedron having six pieces of S at the corner of the octahedron. The tetrahedron $T_1$ has $M_a$ as the central element, and has four pieces of S (incidentally, part or all of S may be substituted with O) at the corner of the tetrahedron; typically, is both $SiO_4$ tetrahedron and $PS_4$ tetrahedron. The tetrahedron $T_2$ has $M_b$ as the central element, and has four pieces of S (incidentally, part of S may be substituted with O) at the corner of the tetrahedron; typically, is $PS_4$ tetrahedron. With regard to the sulfide solid electrolyte material of the second embodiment, at least one of the tetrahedron $T_1$ and the tetrahedron $T_2$ is such that part or all of a S element bonding to a Si element is substituted with an O element. Incidentally, it may be confirmed by XRD pattern analysis and neutron diffraction through Rietveld method that part or all of the S element is substituted with the O element. In addition, the tetrahedron $T_1$ and the octahedron O share an edge, and the tetrahedron $T_2$ and the octahedron O share a corner.

The sulfide solid electrolyte material of the second embodiment greatly characterized by containing the crystal structure as the main body. The ratio of the crystal structure in the whole crystal structure of the sulfide solid electrolyte material is not particularly limited but is preferably higher. The reason therefor is to allow the sulfide solid electrolyte material with high ion conductivity. The ratio of the crystal structure is, specifically, preferably 70 wt % or more, more preferably 90 wt % or more. Incidentally, the ratio of the crystal structure may be measured by radiated light XRD, for example. In particular, the sulfide solid electrolyte material of the second embodiment is preferably a single-phase material of the crystal structure. The reason therefor is to allow ion conductivity to be extremely heightened.

Also, in the second embodiment, in the case where the tetrahedron $T_1$ or the tetrahedron $T_2$ having Si as the central element is represented by $SiS_{4-x}O_x$ (x is an integer satisfying $0 \leq x \leq 4$), the ratio of the tetrahedron with large "x" is preferably large. The reason therefor is to allow the sulfide solid electrolyte material in which reductive decomposition is caused with further difficulty. Specifically, the molar fraction of $SiO_4$ is preferably the largest with respect to all tetrahedrons represented by $SiS_{4-x}O_x$ contained in the sulfide solid electrolyte material. Incidentally, the molar fraction of $SiO_4$ may be measured by NMR and XAFS.

Incidentally, in the second embodiment, at least one of the $M_a$ element and the $M_b$ element contains a Si element. Examples of an element except the Si element include a trivalent, tetravalent or pentavalent element. Also, in the second embodiment, at least one of the $M_a$ element and the $M_b$ element contains a P element. Examples of an element except the P element include a trivalent, tetravalent or pentavalent element. Examples of the trivalent, tetravalent or pentavalent element include one kind selected from the group consisting of Sb, Ge, Sn, B, Al, Ga, In, Ti, Zr, V and Nb.

B. Battery

Next, a battery of the present invention is described. The battery of the present invention is a battery comprises a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the battery with high charge and discharge efficiency.

Figure 3:
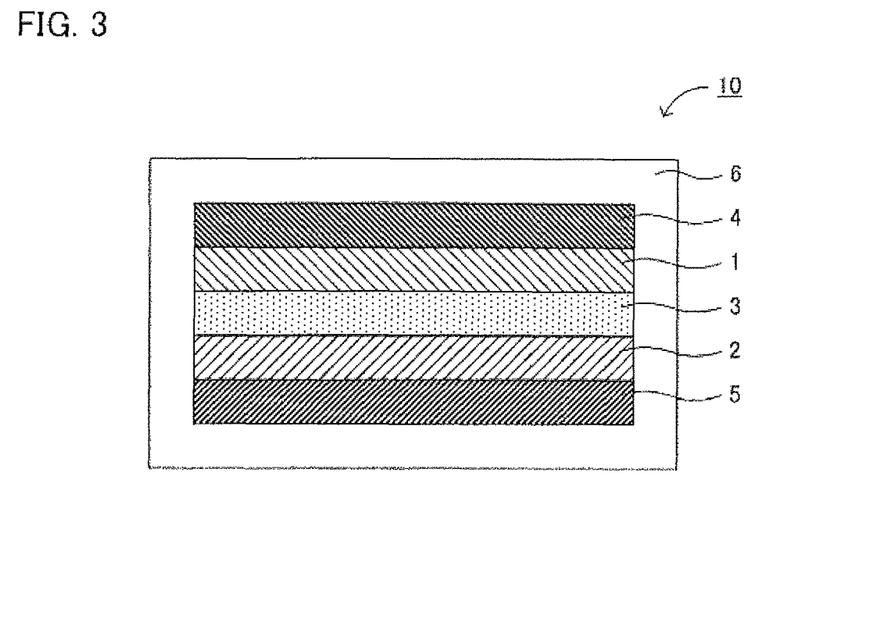
FIG. 3 is a schematic cross-sectional view showing an example of a battery of the present invention.

FIG. 3 is a schematic cross-sectional view showing an example of the battery of the present invention. A battery 10 in FIG. 3 comprises a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, at least one of the cathode active material layer 1, the anode active material layer 2 and the electrolyte layer 3 is greatly characterized by containing the sulfide solid electrolyte material described in "A. Sulfide solid electrolyte material".

The battery of the present invention is hereinafter described in each constitution.

1. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer including a solid electrolyte material. The reason therefor is to allow the battery with high safety as compared with a battery using a liquid electrolyte. In addition, in the present invention, a solid electrolyte layer preferably contains the sulfide solid electrolyte material described above. The ratio of the sulfide solid electrolyte material contained in a solid electrolyte layer is preferably, for example, within a range of 10% by volume to 100% by volume, above all, within a range of 50% by volume to 100% by volume. In particular, in the present invention, a solid electrolyte layer is preferably composed only of the sulfide solid electrolyte material. The reason therefor is to allow the high-output battery. The thickness of a solid electrolyte layer is preferably within a range of 0.1 μm to 1000 μm, for example, and within a range of 0.1 μm to 300 μm, above all. Also, examples of a method for forming a solid electrolyte layer include a method for compression-molding a solid electrolyte material.

Also, the electrolyte layer in the present invention may be a layer including a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the sulfide solid electrolyte material described above. A liquid electrolyte ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (DMC), diethyl carbonate (DEC), ethylmethyl carbonate (EMC) and butylene carbonate (BC).

2. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the sulfide solid electrolyte material described above. The reason therefor is to allow the cathode active material layer with high ion conductivity. The ratio of the sulfide solid electrolyte material contained in the cathode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The cathode active material layer in the present invention may further contain a conductive material. The addition of the conductive material allows conductivity of the cathode active material layer to be improved. Examples of the conductive material include acetylene black, Ketjen Black and carbon fiber. Also, the cathode active material layer may contain a binder. Examples of kinds of the binder include a fluorine-containing binder such as polytetrafluoroethylene (PTFE). Also, the thickness of the cathode active material layer is preferably within a range of 0.1 μm to 1000 μm, for example.

3. Anode Active Material Layer

Next, an anode active material layer in the present invention is described. The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the sulfide solid electrolyte material described above. The reason therefor is to allow the anode active material layer with high ion conductivity. The ratio of the sulfide solid electrolyte material contained in the anode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. Incidentally, a conductive material and a binder used for the anode active material layer are the same as the case of the cathode active material layer described above. Also, the thickness of the anode active material layer is preferably within a range of 0.1 µm to 1000 µm, for example.

4. Other Constitutions

The battery of the present invention comprises at least the electrolyte layer, cathode active material layer and anode active material layer described above, ordinarily further comprising a cathode current collector for collecting the cathode active material layer and an anode current collector for collecting the anode active material layer. Examples of a material for the cathode current collector include SUS, aluminum, nickel, iron, titanium and carbon, preferably SUS among them. On the other hand, examples of a material for the anode current collector include SUS, copper, nickel and carbon, preferably SUS among them. Also, the thickness and shape of the cathode current collector and the anode current collector are preferably selected properly in accordance with factors such as uses of a battery. Also, a battery case of a general battery may be used for a battery case used for the present invention, Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a method for producing the battery of the present invention is not particularly limited if the method is a method such as to allow the battery described above, but the same method as a method for producing a general battery may be used. For example, in the case where the battery of the present invention is an all solid state battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Method for Producing Sulfide Solid Electrolyte Material

Next, a method for producing a sulfide solid electrolyte material of the present invention is described. The method for producing a sulfide solid electrolyte material of the present invention may be roughly divided into two embodiments. Then, the method for producing a sulfide solid electrolyte material of the present invention is described while divided into a first embodiment and a second embodiment.

1. First Embodiment

The method for producing the sulfide solid electrolyte material of the first embodiment is a method for producing the sulfide solid electrolyte material described in "A. Sulfide solid electrolyte material 1. First embodiment", and the method comprises steps of: an ion conductive material synthesizing step of synthesizing an amorphized ion conductive material by mechanical milling while using a raw material composition containing the Li element, the Si element, the P element, the S element and the O element, and a heating step of obtaining the sulfide solid electrolyte material by heating the amorphized ion conductive material.

According to the first embodiment, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the inclusion of an O element in the raw material composition allows the sulfide solid electrolyte material in which charge and discharge efficiency is inhibited from decreasing. Incidentally, each step in the first embodiment is preferably performed under an anoxygenic atmosphere. The reason therefor is to allow an oxygen amount contained in the raw material composition to be equalized with an oxygen amount contained in the obtained sulfide solid electrolyte material. Specific examples of the anoxygenic atmosphere include an inert gas atmosphere and a vacuum atmosphere.

Figure 4:
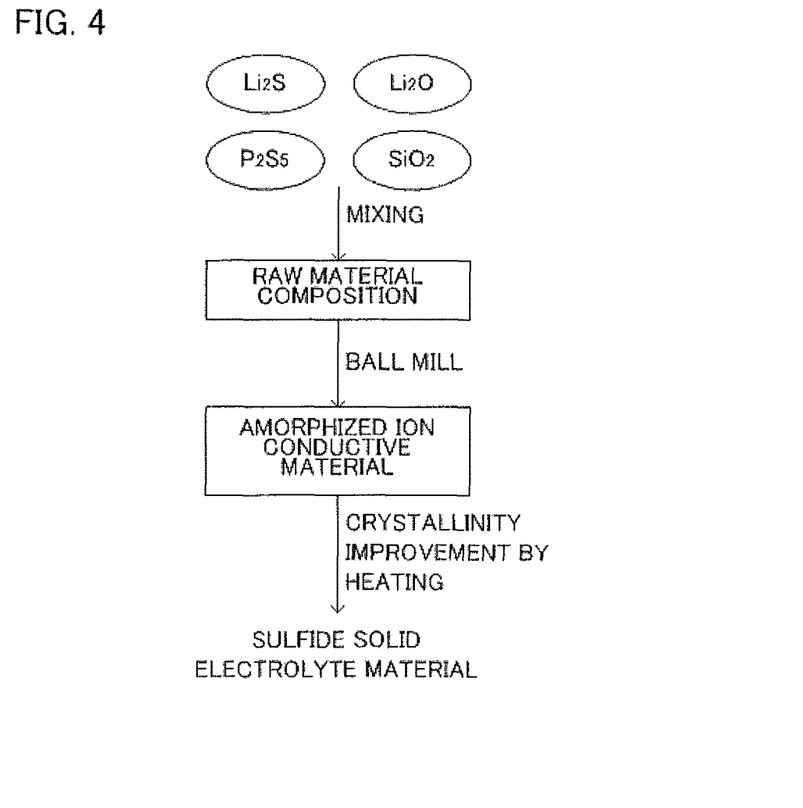
FIG. 4 is an explanatory view showing an example of a method for producing a sulfide solid electrolyte material of the present invention.
Figure 5A:
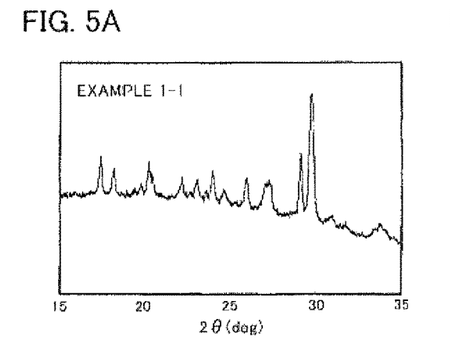
FIGS. 5A to 5E are each an X-ray diffraction spectrum of a sulfide solid electrolyte material obtained in Examples 1-1 to 1-3 and Comparative Examples 1-1 and 1-2.
Figure 5B:
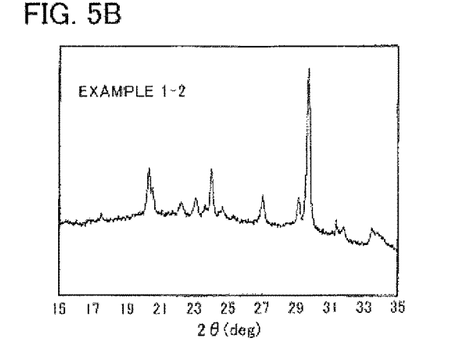
Figure 5C:
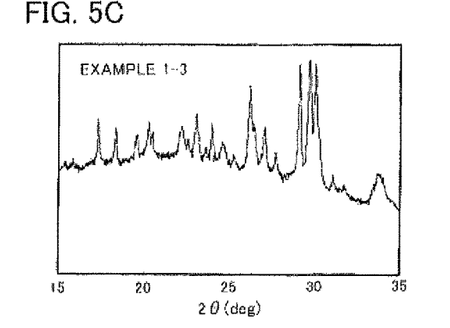
Figure 5D:
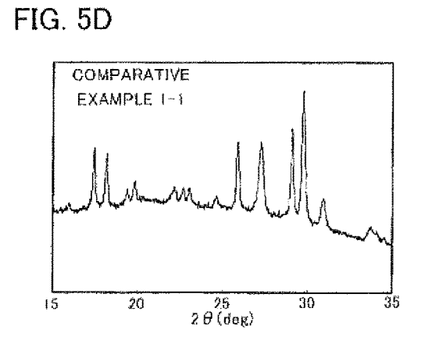
Figure 5E:
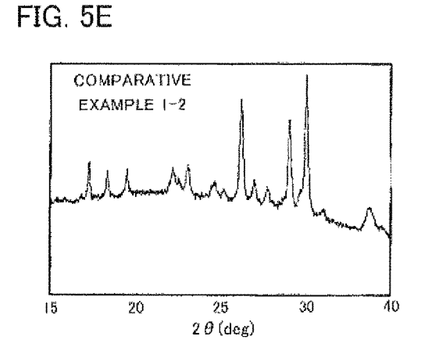
Figure 6A:
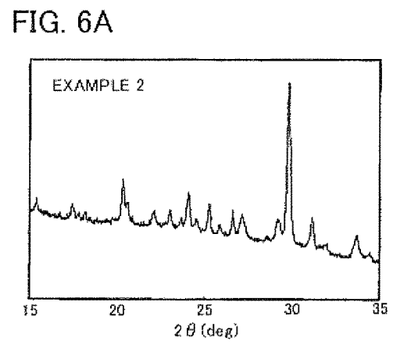
FIGS. 6A to 6E are each an X-ray diffraction spectrum of a sulfide solid electrolyte material obtained in Examples 2 and 3, Reference Example 1, and Comparative Examples 2 and 3.
Figure 6B:
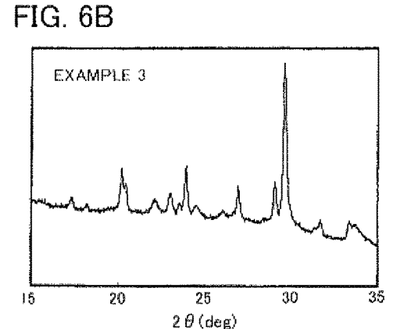
Figure 6C:
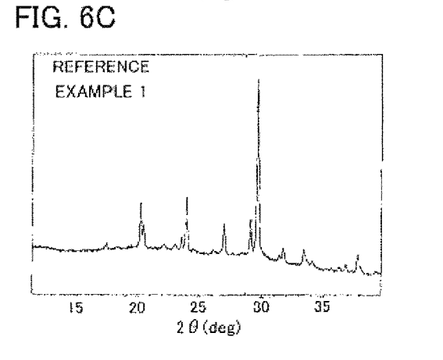
Figure 6D:
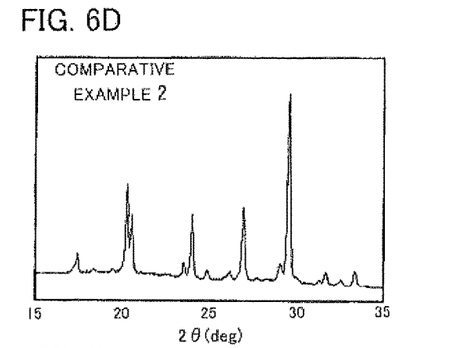
Figure 6E:
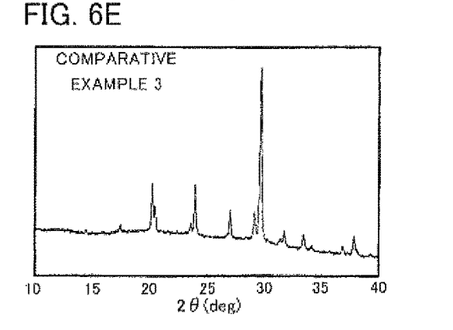

FIG. 4 is an explanatory view showing an example of the method for producing the sulfide solid electrolyte material of the first embodiment. In the method for producing the sulfide solid electrolyte material in FIG. 4, first, a raw material composition is produced by mixing $Li_2S$, $P_2S_5$, $Li_2O$ and $SiO_2$. On this occasion, in order to prevent the raw material composition from deteriorating due to moisture in the air, the raw material composition is preferably produced under an inert gas atmosphere. Next, ball mill is performed for the raw material composition to obtain an amorphized ion conductive material. Next, the amorphized ion conductive material is heated for improving crystallinity to thereby obtain a sulfide solid electrolyte material.

The first embodiment provides the sulfide solid electrolyte material such that the ratio of a crystal phase having a peak in the vicinity of $2\theta=29.58°$ is high; the reason therefor is described below. In the first embodiment, the amorphized ion conductive material is once synthesized unlike a solid-phase method as a conventional synthesis method. Thus, it is conceived that an environment such that the crystal phase A with high ion conductivity (the crystal phase having a peak in the vicinity of $2\theta=29.58°$) is easily precipitated is brought and the crystal phase A may be precipitated positively by the heating step thereafter. The reason why an environment such that the crystal phase A is easily precipitated is brought by amorphizing is not completely clear, but it is conceived that there is a possibility that a solution range in the ion conductive material is changed by mechanical milling and an environment such that the crystal phase A is precipitated with difficulty changes into an environment such that the crystal phase A is easily precipitated.

The method for producing the sulfide solid electrolyte material of the first embodiment is hereinafter described in each step.

(1) Ion Conductive Material Synthesizing Step

First, an ion conductive material synthesizing step in the first embodiment is described. The ion conductive material synthesizing step in the first embodiment is a step of synthesizing an amorphized ion conductive material by mechanical milling while using a raw material composition containing the Li element, the Si element, the P element, the S element and the O element.

The raw material composition in the first embodiment is not particularly limited if the raw material composition is such as to contain the Li element, the Si element, the P element, the S element and the O element. Examples of a compound containing the Li element include a sulfide of Li and an oxide of Li. Specific examples of the sulfide of Li include $Li_2S$. Specific examples of the oxide of Li include $Li_2O$. In the case where part of the Li element is substituted with a monovalent or divalent element, the monovalent or divalent element may be a simple substance, a sulfide and an oxide. Examples of the sulfide of the monovalent or divalent element include $Na_2S$, $K_2S$, $MgS$, $CaS$ and $ZnS$. Examples of the oxide of the monovalent or divalent element include $Na_2O$, $K_2O$, $MgO$, $CaO$ and $ZnO$.

Examples of a compound containing the Si element include a simple substance of Si, an oxide of Si and a sulfide of Si. Specific examples of the sulfide of Si include $SiS_2$ and $Li_4SiS_4$. Specific examples of the oxide of Si include $SiO_2$, $Li_4SiO_4$ and $Li_2SiO_3$. Also, in the first embodiment, the raw material composition preferably contains a material having an Si—O bond. The reason therefor is to allow the sulfide solid electrolyte material in which reductive decomposition is caused with further difficulty. Examples of the material having an Si—O bond include $SiO_2$, $Li_4Si(S_xO_{1-x})_4$ ($0 \leq x < 1$) and $Li_2SiO_3$. In particular, in the first embodiment, the raw material composition preferably contains $SiO_2$. The reason therefor is that the use of an inexpensive material allows the sulfide solid electrolyte material with high ion conductivity, in which reductive decomposition is caused with difficulty. Also, examples of a compound containing the P element include a simple substance of P, an oxide of P and a sulfide of P. Specific examples of the sulfide of P include $P_2S_5$ and $Li_3PS_4$. Specific examples of the oxide of P include $P_2O_5$ and $Li_3PO_4$.

In the case where part of the Si element or the P element is substituted with a trivalent, tetravalent or pentavalent element, the trivalent, tetravalent or pentavalent element may be a simple substance, a sulfide and an oxide. Examples of the sulfide of the trivalent, tetravalent or pentavalent element include $Me_2S_3$ (Me is a trivalent element such as Al, B, Ga, In and Sb), $MeS_2$ (Me is a tetravalent element such as Ge, Sn, Zr, Ti and Nb), $Me_2S_5$ (Me is a pentavalent element such as V), $Li_5MeS_4$ (Me is a trivalent element such as Al, B, Ga, In and Sb), $Li_4MeS_4$ (Me is a tetravalent element such as Ge, Sn, Zr, Ti and Nb), and $Li_3MeS_4$ (Me is a pentavalent element such as V). Examples of the oxide of the trivalent, tetravalent or pentavalent element include $Me_2O_3$ (Me is a trivalent element such as Al, B, Ga, In and Sb), $MeO_2$ (Me is a tetravalent element such as Ge, Sn, Zr, Ti and Nb), $Me_2O_5$ (Me is a pentavalent element such as V), $Li_5MeO_4$ (Me is a trivalent element such as Al, B, Ga, In and Sb), $Li_4MeO_4$ (Me is a tetravalent element such as Ge, Sn, Zr, Ti and Nb) and $Li_3MeO_4$ (Me is a pentavalent element such as V).

In addition, the raw material composition preferably has a composition of $Li_{(4-x)}Si_{(1-x)}P_x(S_{1-y}O_4$ (x satisfies $0 < x < 1$ and y satisfies $0.2 < y$). The reason therefor is to allow the sulfide solid electrolyte material with high ion conductivity. Incidentally, as described above, a composition of $Li_{(4-x)}Si_{(1-x)}P_xS_4$ not having the O element corresponds to a composition of a solid solution of $Li_3PS_4$ and $Li_4SiS_4$. Here, in consideration of the case where the raw material composition contains $Li_2S$, $P_2S_5$ and $SiS_2$, the ratio of $Li_2S$ and $P_2S_5$ such as to allow $Li_3PS_4$ is $Li_2S:P_2S_5=75:25$ on a molar basis. On the other hand, the ratio of $Li_2S$ and $SiS_2$ such as to allow $Li_4SiS_4$ is $Li_2S:SiS_2=66.7:33.3$ on a molar basis. Thus, the used amount of $Li_2S$, $P_2S_5$ and $SiS_2$ is preferably determined in consideration of these ratios. Also, a preferable range of "x" and "y" is the same as the contents described in "A. Sulfide solid electrolyte material".

Mechanical milling is a method for grinding a test sample while allowing mechanical energy thereto. In the first embodiment, an amorphized ion conductive material is synthesized by allowing mechanical energy to the raw material composition. Examples of such mechanical milling include vibrating mill, ball mill, turbo mill, mechano-fusion and disk mill; among them, preferably vibrating mill and ball mill.

The conditions of vibrating mill are not particularly limited if the conditions are such as to allow an amorphized ion conductive material. The vibration amplitude of vibrating mill is preferably, for example, within a range of 5 mm to 15 mm, above all, within a range of 6 mm to 10 mm. The vibration frequency of vibrating mill is preferably, for example, within a range of 500 rpm to 2000 rpm, above all, within a range of 1000 rpm to 1800 rpm. The filling factor of a test sample of vibrating mill is preferably, for example, within a range of 1% by volume to 80% by volume, above all, within a range of 5% by volume to 60% by volume, particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material. Generally, larger number of revolutions brings higher production rate of the ion conductive material, and longer treating time brings higher conversion ratio of the raw material composition into the ion conductive material. The number of weighing table revolutions in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of 1 hour to 70 hours, above all.

Incidentally, in the first embodiment, the amorphized ion conductive material is preferably synthesized so as to bring an environment such that the crystal phase having a peak in the vicinity of $2\theta=29.58°$ is easily precipitated.

(2) Heating Step

The heating step in the first embodiment is a step of obtaining the sulfide solid electrolyte material by heating the amorphized ion conductive material.

In the first embodiment, the improvement of crystallinity is intended by heating the amorphized ion conductive material. This heating allows the crystal phase A with high ion conductivity (the crystal phase having a peak in the vicinity of $2\theta=29.58°$) to be precipitated positively.

The heating temperature in the first embodiment is not particularly limited if the heating temperature is a temperature such as to allow a desired sulfide solid electrolyte material, but is preferably a temperature of crystallization temperature or more of the crystal phase A (the crystal phase having a peak in the vicinity of 2θ=29.58°). Specifically, the heating temperature is preferably 300° C. or more, more preferably 350° C. or more, furthermore preferably 400° C. or more, particularly preferably 450° C. or more. On the other hand, the heating temperature is preferably 1000° C. or less, more preferably 700° C. or less, furthermore preferably 650° C. or less, particularly preferably 600° C. or less. Also, the heating time is preferably adjusted properly so as to allow a desired sulfide solid electrolyte material. Also, heating in the first embodiment is preferably performed under an inert gas atmosphere or in a vacuum from the viewpoint of preventing oxidation. Also, the sulfide solid electrolyte material obtained by the first embodiment is the same as the contents described in "A. Sulfide solid electrolyte material 1. First embodiment"; therefore, the description herein is omitted.

2. Second Embodiment

The method for producing the sulfide solid electrolyte material of the second embodiment is a method for producing the sulfide solid electrolyte material described in "A. Sulfide solid electrolyte material 2. Second embodiment", and the method comprises steps of: an ion conductive material synthesizing step of synthesizing an amorphized ion conductive material by mechanical milling while using a raw material composition containing the Li element, the $M_a$ element, the $M_b$ element, the S element and the O element, and a heating step of obtaining the sulfide solid electrolyte material by heating the amorphized ion conductive material.

According to the second embodiment, amorphization is performed in the ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the inclusion of an O element in the raw material composition allows the sulfide solid electrolyte material in which charge and discharge efficiency is inhibited from decreasing.

The ion conductive material synthesizing step and the heating step in the second embodiment are basically the same as the contents described in "C. Method for producing sulfide solid electrolyte material 1. First embodiment"; therefore, the description herein is omitted. Various kinds of conditions are preferably determined so as to allow a desired sulfide solid electrolyte material.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically by illustrating examples hereinafter.

Example 1-1

Lithium sulfide ($Li_2S$, manufactured by Nippon Chemical Industrial Co., Ltd.) and diphosphorus pentasulfide ($P_2S_5$, manufactured by Sigma-Aldrich Co. LLC.) were used as a starting material. These powders were mixed in a glove box under an argon atmosphere so as to become a molar ratio ($Li_3PS_4$) of $75Li_2S·25P_2S_5$. Projected into a vessel of planetary ball milling (45 cc, made of $ZrO_2$) was 1 g of the mixed starting material, and $ZrO_2$ ball (ϕ=10 mm, 10 pieces) was further projected thereinto to hermetically seal the vessel completely. This vessel was mounted on a planetary ball milling machine (P7™ manufactured by Fritsch Japan Co., Ltd.) to perform mechanical milling for 40 hours at the number of weighing table revolutions of 370 rpm. Thus, $Li_3PS_4$ powder was obtained.

The obtained $Li_3PS_4$ powder and $Li_4SiO_4$ powder (manufactured by Alfa) were mixed at the weight ratio shown in Table 1 in a glove box under an argon atmosphere to obtain a raw material composition. Projected into a vessel of planetary ball milling (45 cc, made of $ZrO_2$) was 1 g of the raw material composition, and $ZrO_2$ ball (ϕ=10 mm, 10 pieces) was further projected thereinto to hermetically seal the vessel completely. This vessel was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled to room temperature. Thus, a crystalline sulfide solid electrolyte material having a composition of $Li_{3.25}Si_{0.25}P_{0.75}(S_{0.75}O_{0.25})_4$ was obtained. Incidentally, the composition corresponds to a composition of x=0.75 and y=0.25 in $Li_{(4-x)}Si_{(1-x)}P_x(S_{1-y}O_y)_4$.

Example 1-2

A crystalline sulfide solid electrolyte material was obtained in the same manner as Example 1-1 except for modifying the weight ratio of the $Li_3PS_4$ powder and the $Li_4SiO_4$ powder into the weight ratio shown in Table 1. The obtained sulfide solid electrolyte material has a composition of $Li_{3.3}Si_{0.3}P_{0.7}(S_{0.7}O_{0.3})_4$, which corresponds to a composition of x=0.7 and y=0.3 in $Li_{(4-x)}Si_{(1-x)}P_x(S_{1-y}O_y)_4$.

Example 1-3

A crystalline sulfide solid electrolyte material was obtained in the same manner as Example 1-1 except for modifying the weight ratio of the $Li_3PS_4$ powder and the $Li_4SiO_4$ powder into the weight ratio shown in Table 1. The obtained sulfide solid electrolyte material has a composition of $Li_{3.35}Si_{0.35}P_{0.65}(S_{0.65}O_{0.35})_4$ which corresponds to a composition of x=0.65 and y=0.35 in $Li_{(4-x)}Si_{(1-x)}P_x(S_{1-y}O_y)_4$.

Comparative Example 1-1

A crystalline sulfide solid electrolyte material was obtained in the same manner as Example 1-1 except for modifying the weight ratio of the $Li_3PS_4$ powder and the $Li_4SiO_4$ powder into the weight ratio shown in Table 1. The obtained sulfide solid electrolyte material has a composition of $Li_{3.2}Si_{0.2}P_{0.8}(S_{0.8}O_{0.2})_4$, which corresponds to a composition of x=0.8 and y=0.2 in $Li_{(4-x)}Si_{(1-x)}P_x(S_{1-y}O_y)_4$.

Comparative Example 1-2

A crystalline sulfide solid electrolyte material was obtained in the same manner as Example 1-1 except for modifying the weight ratio of the $Li_3PS_4$ powder and the $Li_4SiO_4$ powder into the weight ratio shown in Table 1. The obtained sulfide solid electrolyte material has a composition of $Li_{3.4}Si_{0.4}P_{0.6}(S_{0.6}O_{0.4})_4$, which corresponds to a composition of x=0.6 and y=0.4 in $Li_{(4-x)}Si_{(1-x)}P_x(S_{1-y}O_y)_4$.

Example 2

Lithium sulfide ($Li_2S$, manufactured by Nippon Chemical Industrial Co., Ltd.), lithium oxide ($Li_2O$, manufactured by Kojundo Chemical Lab. Co., Ltd.), diphosphorus pentasulfide ($P_2S_5$, manufactured by Sigma-Aldrich Co. LLC.) and silicon oxide ($SiO_2$, manufactured by Kojundo Chemical Lab. Co., Ltd.) were used as a starting material. These powders were mixed at the weight ratio shown in Table 2 in a glove box under an argon atmosphere to obtain a raw material composition. A crystalline sulfide solid electrolyte material was obtained in the same manner as Example 1-1 except for using the obtained raw material composition. The obtained sulfide solid electrolyte material has a composition of $Li_{3.3}Si_{0.3}P_{0.7}(S_{0.7}O_{0.3})_4$, which corresponds to a composition of x=0.7 and y=0.3 in $Li_{(4-x)}Si_{(1-x)}P_x(S_{1-y}O_y)_4$.

Example 3

Lithium sulfide ($Li_2S$, manufactured by Nippon Chemical Industrial Co., Ltd.), lithium oxide ($Li_2O$, manufactured by Kojundo Chemical Lab. Co., Ltd.), diphosphorus pentasulfide ($P_2S_5$, manufactured by Sigma-Aldrich Co. LLC.) and silicon sulfide ($SiS_2$, manufactured by Kojundo Chemical Lab. Co., Ltd.) were used as a starting material. These powders were mixed at the weight ratio shown in Table 2 in a glove box under an argon atmosphere to obtain a raw material composition. A crystalline sulfide solid electrolyte material was obtained in the same manner as Example 1-1 except for using the obtained raw material composition. The obtained sulfide solid electrolyte material has a composition of $Li_{3.3}Si_{0.3}P_{0.7}(S_{0.7}O_{0.3})_4$, which corresponds to a composition of x=0.7 and y=0.3 in $Li_{(4-x)}Si_{(1-x)}P_x(S_{1-y}O_y)_4$.

Reference Example 1

Lithium sulfide ($Li_2S$, manufactured by Nippon Chemical Industrial Co., Ltd.), lithium oxide ($Li_2O$, manufactured by Kojundo Chemical Lab. Co., Ltd.), diphosphorus pentasulfide ($P_2S_5$, manufactured by Sigma-Aldrich Co. LLC.) and silicon sulfide ($SiS_2$, manufactured by Kojundo Chemical Lab. Co., Ltd.) were used as a starting material. These powders were mixed at the weight ratio shown in Table 2 in a glove box under an argon atmosphere to obtain a raw material composition. A crystalline sulfide solid electrolyte material was obtained in the same manner as Example 1-1 except for using the obtained raw material composition. The obtained sulfide solid electrolyte material has a composition of $Li_{3.4}Si_{0.4}P_{0.6}(S_{0.9}O_{0.1})_4$, which corresponds to a composition of x=0.6 and y=0.1 in $Li_{(4-x)}Si_{(1-x)}P_x(S_{1-y}O_y)_4$.

Comparative Example 2

Lithium sulfide ($Li_2S$, manufactured by Nippon Chemical Industrial Co., Ltd.), diphosphorus pentasulfide ($P_2S_5$, manufactured by Sigma-Aldrich Co. LLC.) and germanium sulfide ($GeS_2$, manufactured by Kojundo Chemical Lab. Co., Ltd.) were used as a starting material. These powders were mixed at the weight ratio shown in Table 2 in a glove box under an argon atmosphere to obtain a raw material composition. A crystalline sulfide solid electrolyte material was obtained in the same manner as Example 1-1 except for using the obtained raw material composition. The obtained sulfide solid electrolyte material has a composition of $Li_{3.35}Ge_{0.5}P_{0.65}S_4$.

Comparative Example 3

Lithium sulfide ($Li_2S$, manufactured by Nippon Chemical Industrial Co., Ltd.), diphosphorus pentasulfide ($P_2S_5$, manufactured by Sigma-Aldrich Co. LLC.) and silicon sulfide ($SiS_2$, manufactured by Kojundo Chemical Lab. Co., Ltd.) were used as a starting material. These powders were mixed at the weight ratio shown in Table 2 in a glove box under an argon atmosphere to obtain a raw material composition. A crystalline sulfide solid electrolyte material was obtained in the same manner as Example 1-1 except for using the obtained raw material composition. The obtained sulfide solid electrolyte material has a composition of $Li_{3.4}Si_{0.4}P_{0.6}S_4$, which corresponds to a composition of x=0.6 and y=0 in $Li_{(4-x)}Si_{(1-x)}P_x(S_{1-y}O_y)_4$.

[Evaluations]
(X-Ray Diffraction Measurement)

X-ray diffraction (XRD) measurement was performed while using the sulfide solid electrolyte material obtained in each of Examples 1-1 to 1-3 and Comparative Examples 1-1 and 1-2. XRD measurement was performed for a powder sample under an inert atmosphere on the conditions of using a CuKα ray. The results are shown in FIGS. 5A to 5E. As shown in FIGS. 5A to 5E, in Examples 1-1 to 1-3, it was confirmed that the crystal phase A described above was formed. In contrast, in Comparative Examples 1-1 and 1-2, it was confirmed that the crystal phase A described above was not formed.

X-ray diffraction (XRD) measurement was similarly performed while using the sulfide solid electrolyte material obtained in each of Examples 2 and 3, Reference Example 1, and Comparative Examples 2 and 3. The results are shown in FIGS. 6A to 6E. As shown in FIGS. 6A to 6E, in Examples 2 and 3, Reference Example 1, and Comparative Examples 2 and 3, it was confirmed that the crystal phase A described above was formed. Incidentally, the value of $I_B/I_A$ was calculated by using the sample in which the formation of the crystal phase A was confirmed. The results are shown in Tables 1 and 2.

TABLE 1

|  | Comparative Example 1-1 | Example 1-1 | Example 1-2 | Example 1-3 | Comparative Example 1-2 |
| --- | --- | --- | --- | --- | --- |
| x | 0.8 | 0.75 | 0.7 | 0.65 | 0.6 |
| y | 0.2 | 0.25 | 0.3 | 0.35 | 0.4 |
| $I_B/I_A$ | — | 0.23 | 0 | 0.54 | — |
| $Li_3PS_4$ | 0.857337 | 0.818418 | 0.778053 | 0.736158 | 0.692646 |
| $Li_4SiO_4$ | 0.142663 | 0.181582 | 0.221947 | 0.263842 | 0.307354 |

TABLE 2

|  | Example 2 | Example 3 | Reference Example 1 | Comparative Example 2 | Comparative Example 3 |
| --- | --- | --- | --- | --- | --- |
| x | 0.7 | 0.7 | 0.6 | — | 0.6 |
| y | 0.3 | 0.3 | 0.1 | 0 | 0 |
| $I_B/I_A$ | 0.12 | 0 | 0 | 0 | 0 |
| $Li_2S$ | 0.29781 | 0.127637 | 0.340832 | 0.390529 | 0.429936 |
| $Li_2O$ | 0.110671 | 0.221344 | 0.068199 | 0 | 0 |
| $P_2S_5$ | 0.480239 | 0.48024 | 0.380493 | 0.366564 | 0.367033 |
| $SiS_2$ | 0 | 0.17077 | 0.210476 | 0 | 0.203031 |

TABLE 2-continued

| | Example 2 | Example 3 | Reference Example 1 | Comparative Example 2 | Comparative Example 3 |
|---|---|---|---|---|---|
| SiO$_2$ | 0.11127 | 0 | 0 | 0 | 0 |
| GeS$_2$ | 0 | 0 | 0 | 0.242907 | 0 |

(X-Ray Structural Analysis)

The crystal structure of the sulfide solid electrolyte material obtained in Comparative Example 2 was identified by X-ray structural analysis. The crystal system and crystallographic group were determined by a direct method on the basis of a diffraction pattern obtained in XRD to thereafter identify the crystal structure by a real space method. As a result, it was confirmed that the sulfide solid electrolyte material had the crystal structure as shown in FIG. 2. That is to say, the crystal structure was such that the tetrahedron T$_1$ and the octahedron O shared an edge, and the tetrahedron T$_2$ and the octahedron O shared a corner. Also, as described above, Examples 1-1 to 1-3, 2 and 3 had the same diffraction pattern as Comparative Example 2, so that it was confirmed that the same crystal structure was formed in these Examples.

(Charge and Discharge Efficiency Measurement)

An evaluation battery was produced by using the sulfide solid electrolyte material obtained in each of Examples 1-2, 2 and 3, Reference Example 1, and Comparative Examples 2 and 3 to evaluate charge and discharge efficiency. First, the Li$_3$PS$_4$ powder synthesized in Example 1-1 was weighed by 100 mg, put in a cylinder made of MACOR, and pressed at a pressure of 1 ton/cm$^2$ to obtain a solid electrolyte layer. Next, the sulfide solid electrolyte material and graphite powder were mixed at a weight ratio of 50:50, and the obtained powder was weighed by 12 mg, disposed on one surface of the solid electrolyte layer, and pressed at a pressure of 4 ton/cm$^2$ to obtain a working electrode. Lastly, an LiIn foil as a reference electrode was disposed on the other surface of the solid electrolyte layer, pressed at a pressure of 1 ton/cm$^2$, and bolted at 6 Ncm to obtain an evaluation battery.

The electric potential of the working electrode was charged up to −0.62 V with respect to the reference electrode, and thereafter discharged up to 1 V. The current density was determined at 0.15 mA/cm$^2$. The charge and discharge efficiency was calculated by the following formula.

Charge and discharge efficiency (%)=discharge capacity/charge capacity×100

Figure 7:
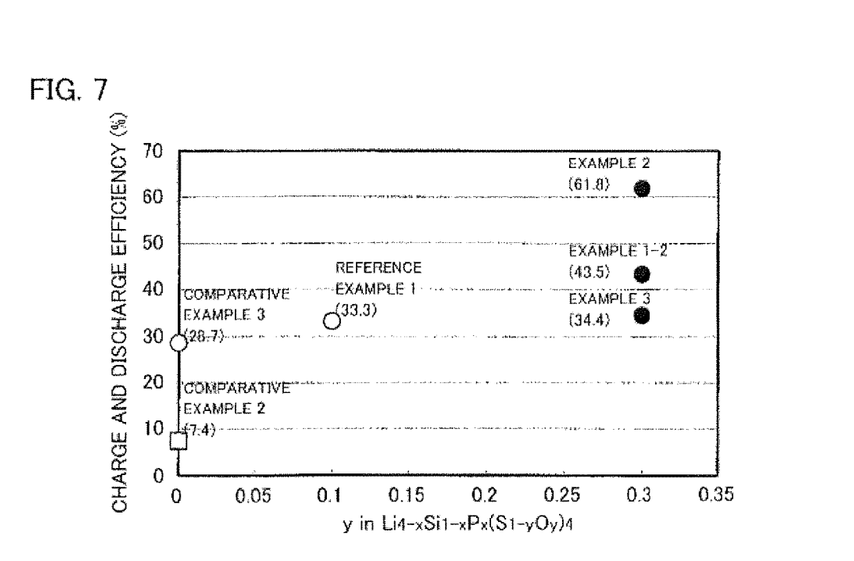
FIG. 7 is a result of measuring charge and discharge efficiency for a battery using a sulfide solid electrolyte material obtained in Examples 1-2, 2 and 3, Reference Example 1, and Comparative Examples 2 and 3.

The obtained results are shown in FIG. 7.

As shown in FIG. 7, it was confirmed that the evaluation battery obtained in Examples 1-2, 2 and 3 had high charge and discharge efficiency. Also, when Comparative Example 2 was compared with Comparative Example 3, it was suggested that the substitution of Ge contained in the sulfide solid electrolyte material with Si improved charge and discharge efficiency. Also, when Examples 1-2, 2 and 3, and Reference Example 1 was compared with Comparative Example 3, it was suggested that the substitution of S contained in the sulfide solid electrolyte material with O further improved charge and discharge efficiency.

Figure 8:
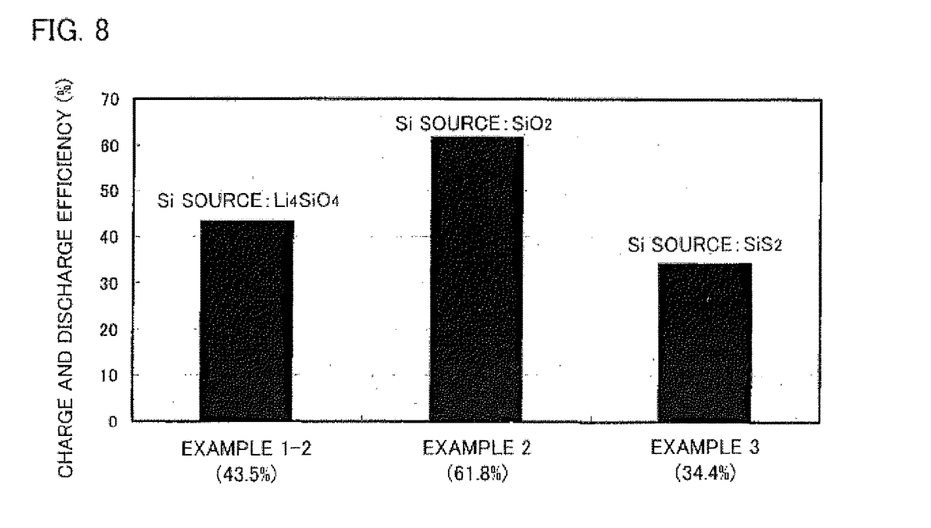
FIG. 8 is a result of measuring charge and discharge efficiency for a battery using a sulfide solid electrolyte material obtained in Examples 1-2, 2 and 3.

Also, as shown in FIG. 8, when Examples 1-2, 2 and 3 were compared, it might be confirmed that the case of using a material having an Si—O bond as an Si source improved charge and discharge efficiency more than the case of using a material not having an Si—O bond.

(Measurement of Li Ion Conductance)

Figure 9:
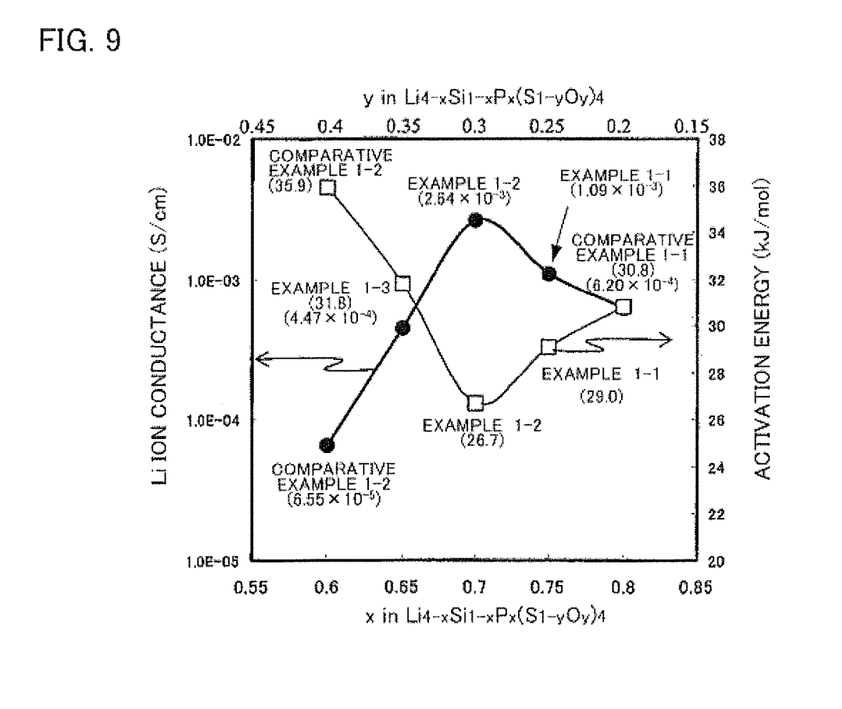
FIG. 9 is a result of measuring Li ion conductance of a sulfide solid electrolyte material obtained in Examples 1-1 to 1-3 and Comparative Examples 1-1 and 1-2.

Li ion conductance at a temperature of 25° C. was measured while using the sulfide solid electrolyte material obtained in each of Examples 1-1 to 1-3 and Comparative Examples 1-1 and 1-2. First, the sulfide solid electrolyte material was weighed by 200 mg, put in a cylinder made of MACOR, and pressed at a pressure of 4 ton/cm$^2$. Both edges of the obtained pellets were held between a pin made of SUS, and confining pressure was applied to the pellets by bolting to obtain an evaluation cell. Li ion conductance was calculated by an alternating current impedance method in a state of maintaining the evaluation cell at a temperature of 25° C. Solartron 1260™ was used for the measurement, and impressed voltage was determined at 5 mV and measuring frequency band was determined at 0.01 to 1 MHz. Also, Arrhenius plot was made from Li ion conductance at each temperature while changing the temperature during the measurement to calculate activation energy. The results are shown in FIG. 9. As shown in FIG. 9, it was suggested that "x" preferably satisfied 0.65≤x≤0.75. Similarly, it was suggested that "y" preferably satisfied 0.25≤y≤0.35.

Reference Example 2

Production energy of each structure in the following decomposition reaction formulae (1) to (3) was obtained by first-principle calculation to calculate reductive decomposition potential from Nernst equation.

Formula (1)

Formula (2)

Formula (3)

Figure 10:
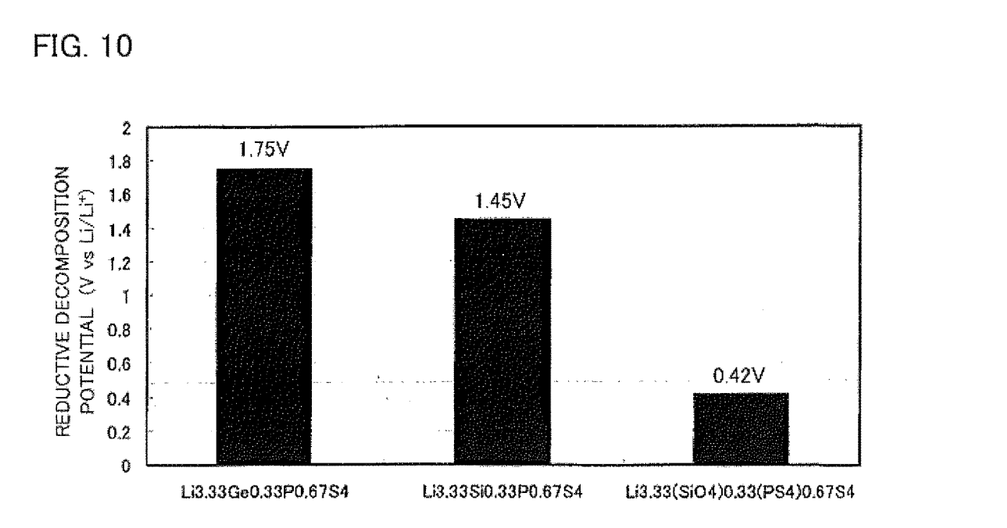
FIG. 10 is a result of first-principle calculation with regard to reductive decomposition potential.

The formula (1) expressed that Ge in the crystal phase A was in a state of a GeS$_4$ tetrahedron tetrahedrally coordinated with S, the formula (2) expressed that Si in the crystal phase A was in a state of an SiS$_4$ tetrahedron tetrahedrally coordinated with S, and the formula (3) expressed that Si in the crystal phase A was in a state of an SiO$_4$ tetrahedron tetrahedrally coordinated with O. The results are shown in FIG. 10. As shown in FIG. 10, it was suggested that Si was lower in reductive decomposition potential and electrochemically more stable than Ge. In addition, it was suggested that the selective coordination of Si with O improved electrochemical stability further. That is to say, from the viewpoint of electrochemical stability, it was suggested that an Si—O bond was more preferable than an Si—S bond and an SiO$_4$ tetrahedron was preferably formed.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . battery

The invention claimed is:
1. A sulfide solid electrolyte material comprising a Li element, a Si element, a P element, a S element and an O element,
having a peak at a position of 2θ=29.58°±0.50° in X-ray diffraction measurement using a CuKα ray, wherein the sulfide solid electrolyte material does not have a peak at a position of 2θ=27.33°±0.50° in X-ray diffraction measurement using a CuKα ray, or in a case of having a peak at the position of 2θ=27.33°±0.50°, a value of $I_B/I_A$ is 1 or less when diffraction intensity at the peak of 2θ=29.58°±0.50° is regarded as $I_A$ and diffraction intensity at the peak of 2θ=27.33°±0.50° is regarded as $I_B$; and wherein a molar fraction (O/(S+O)) of the O element to a total of the S element and the O element is larger than 0.2.

2. A sulfide solid electrolyte material comprising:

an octahedron O composed of a Li element and a S element;

a tetrahedron $T_1$ composed of an $M_a$ element and a S element; and a tetrahedron $T_2$ composed of an $M_b$ element and a S element, wherein the tetrahedron $T_1$ and the octahedron O share an edge, and the tetrahedron $T_2$ and the octahedron O contain a crystal structure sharing a corner as a main body; and at least one of the $M_a$ and the $M_b$ contains Si, at least one of the $M_a$ and the $M_b$ contains P, at least one of the tetrahedron $T_1$ and the tetrahedron $T_2$ is such that a part or all of the S element bonding to the Si element is substituted with an O element, and a molar fraction (O/(S+O)) of the O element to a total of the S element and the O element is larger than 0.2.

3. The sulfide solid electrolyte material according to claim 1, wherein the molar fraction (O/(S+O)) satisfies 0.25≤(O/(S+O))≤0.35.

4. The sulfide solid electrolyte material according to claim 2, wherein the molar fraction (O/(S+O)) satisfies 0.25≤(O/(S+O))≤0.35.

5. The sulfide solid electrolyte material according to claim 1, wherein a molar fraction (P/(P+Si)) of the P element to a total of the P element and the Si element satisfies 0.65≤(P/(P+Si))≤0.75.

6. The sulfide solid electrolyte material according to claim 2, wherein a molar fraction (P/(P+Si)) of the P element to a total of the P element and the Si element satisfies 0.65≤(P/(P+Si))≤0.75.

7. A battery comprising:

a cathode active material layer containing a cathode active material;

an anode active material layer containing an anode active material; and an electrolyte layer formed between the cathode active material layer and the anode active material layer, wherein at least one of the cathode active material layer, the anode active material layer and the electrolyte layer contains the sulfide solid electrolyte material according to claim 1.

8. A battery comprising:

a cathode active material layer containing a cathode active material;

an anode active material layer containing an anode active material; and an electrolyte layer formed between the cathode active material layer and the anode active material layer, wherein at least one of the cathode active material layer, the anode active material layer and the electrolyte layer contains the sulfide solid electrolyte material according to claim 2.

9. A method for producing a sulfide solid electrolyte material, the sulfide solid electrolyte material being the sulfide solid electrolyte material according to claim 1, comprising steps of:

an ion conductive material synthesizing step of synthesizing an amorphized ion conductive material by mechanical milling while using a raw material composition containing the Li element, the Si element, the P element, the S element and the O element; and a heating step of obtaining the sulfide solid electrolyte material by heating the amorphized ion conductive material.

10. A method for producing a sulfide solid electrolyte material, the sulfide solid electrolyte material being the sulfide solid electrolyte material according to claim 2, comprising steps of:

an ion conductive material synthesizing step of synthesizing an amorphized ion conductive material by mechanical milling while using a raw material composition containing the Li element, the $M_a$ element, the $M_b$ element, the S element and the O element; and a heating step of obtaining the sulfide solid electrolyte material by heating the amorphized ion conductive material.

11. The method for producing the sulfide solid electrolyte material according to claim 9, wherein the raw material composition contains a material having an Si—O bond.

12. The method for producing the sulfide solid electrolyte material according to claim 10, wherein the raw material composition contains a material having an Si—O bond.

13. The sulfide solid electrolyte material according to claim 1, wherein the molar fraction (O/(S+O)) satisfies 0.2<(O/(S+O))≤0.4.

14. The sulfide solid electrolyte material according to claim 2, wherein the molar fraction (O/(S+O)) satisfies 0.2<(O/(S+O))≤0.4.

* * * * *